June 7, 1966 R. C. BARNES 3,254,802
POWDERED FOOD DISPENSER
Filed Aug. 24, 1964 2 Sheets-Sheet 1

INVENTOR.
RANDALL CLIFFORD BARNES
BY
John P. Murphy
ATTORNEY

June 7, 1966  R. C. BARNES  3,254,802
POWDERED FOOD DISPENSER
Filed Aug. 24, 1964  2 Sheets-Sheet 2

INVENTOR.
RANDALL CLIFFORD BARNES
BY John P. Murphy
ATTORNEY

United States Patent Office 3,254,802
Patented June 7, 1966

3,254,802
POWDERED FOOD DISPENSER
Randall Clifford Barnes, Halsey Valley Road,
Tioga Center, N.Y. 13845
Filed Aug. 24, 1964, Ser. No. 391,461
3 Claims. (Cl. 222—181)

This invention relates generally to a device for dispensing fluent materials, and is especially concerned with dispensing fluent materials in the nature of granules or powder.

While the device of the present invention has been primarily developed for use in the dispensing of instant coffee, and will be illustrated and described hereinafter with particular reference thereto, it is understood that such description is not intended in a limiting sense, but merely as illustrative, and that the device is capable of use with many varied materials, all of which applications are intended to be comprehended herein.

As is well known, instant coffees are commonly prepared by placing one teaspoonful of the coffee material in a cup and adding hot water. Stronger or weaker coffee is obtained by roughly estimating a fuller or less full teaspoon. In dealing with such small quantities, the actual variation in the amount of coffee material from that required to produce coffee of the desired strength usually amounts to a relatively high percentage of the total, so that the consumer frequently receives coffee not suited to his taste.

Accordingly, it is an important object of the present invention to provide a dispensing device for instant coffee and similar fluent materials, which device is extremely simple to operate, requiring only a single motion of one hand to dispense a precisely measured quantity of the fluent material directly into a cup or other receptacle. Them present invention also contemplates the provision of means for instantaneously adjusting the device to dispense the particularly desired, accurately metered quantity.

It is another object of the present invention to provide a dispensing device of the type described which is adapted for direct connection to a container or jar, such as a jar of instant coffee, for dispensing the fluent material directly from its original container without intermediate transfer of the material, to minimize work, prevent spillage and waste, and wherein the dispenser effectively serves to seal or keep the container closed to maintain freshness of the contents throughout the entire period of use.

It is still another object of the present invention to provide a dispensing device having the advantageous characteristics mentioned in the preceding paragraphs which is simple in construction, foolproof in operation, durable and reliable in use, which can be manufactured and sold at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
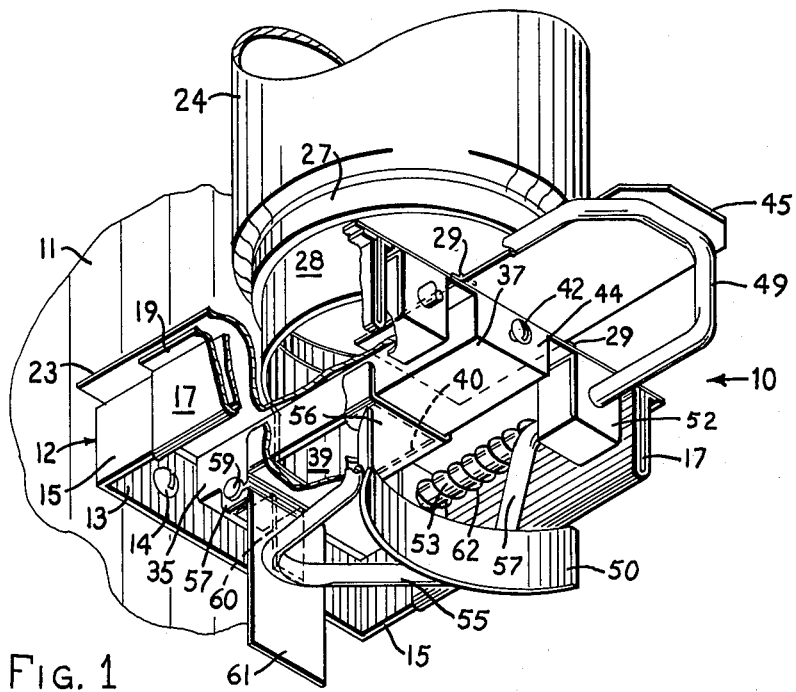
FIG. 1 is a perspective view of the invention, with parts cut away.
Figure 2:
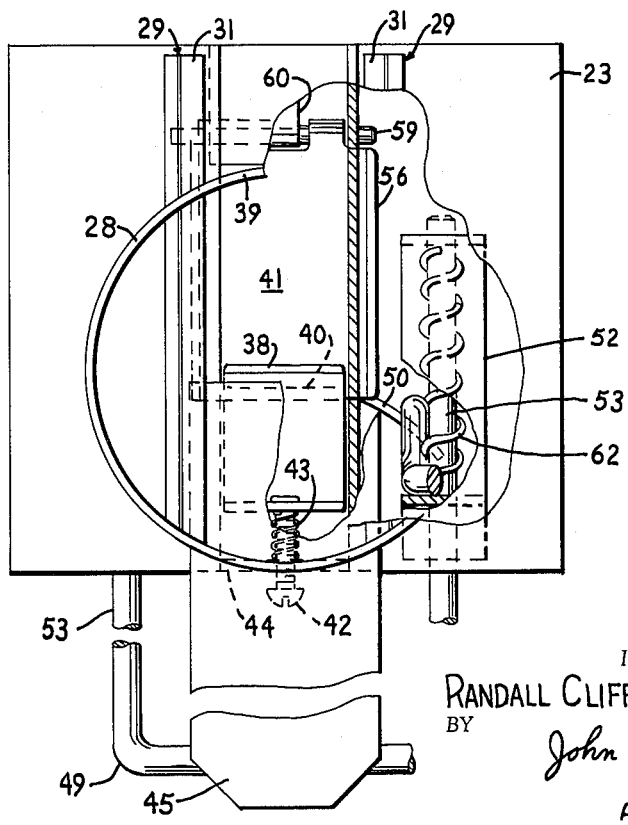
FIG. 2 is an enlarged plan view, with some parts cut away.

Referring now more particularly to the drawings and specifically to FIGS. 1 and 2 thereof, the dispensing device is there generally designated 10, and illustrated as mounted on a wall surface 11 by a wall bracket 12. The wall bracket 12 includes a back plate 13 secured in facing engagement with wall surface 11 by screws 14 or other suitable fastening means. In addition, a pair of opposing outwardly extending side pieces 15 project from back plate 13 and are detachably received by bracket receptacles 17. Each bracket receptacle may have suitable means such as flanges 19 or the like to secure same to the underside of a base plate 23. The side pieces 15, and the bracket receptacles 17 projecting horizontally from the wall surface provide a detachable housing for the dispensing device.

An inverted conventional jar or other container 24 is illustrated as being engaged with threads 27 of the collar 28. The jar receptacle collar 28 is secured to a pair of horizontal guides 29. Each guide plate is shaped in the form of a longitudinal flange 31, as will appear.

Figure 5:
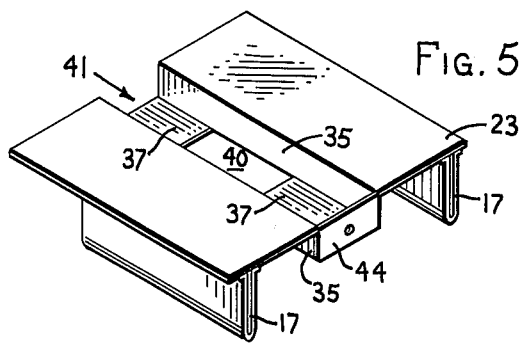

Formed by base plate 23 is a measuring compartment 41 shown in FIG. 5 as generally rectangular in cross section and defined by two vertical walls 35, by back plate 39 which is an extension of collar 28, and by bottom plate 37. Disposed within this measuring compartment is a regulator 38. The bottom plate 37 provides a base support for regulator 38 which rests on it Attached to the regulator 38 by means of an adjustment screw 42 is a regulator spring 43.

Figure 6:
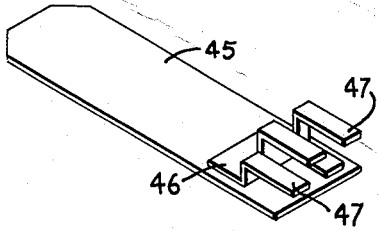
FIGS. 5 and 6 are perspective views of different elements of the invention, illustrating certain features of each.

Slidably disposed between guide plates 29 and laterally restrained thereby is a shutter 45. The shutter may be generally rectangular in configuration so that it is movable toward and from a position between the mouth of jar 24 and the measuring compartment 41, was will appear. An agitator 46, as shown by FIG. 6, comprising fingers 47 is secured to the shutter 45. The fingers 47 extend upwardly and outwardly from the shutter so that with each reciprocation of the shutter, the agitator moves to stir the powdered material at the open end of the jar.

An actuating member or rod 49, which may be generally U-shaped is fixed to the forward end of the shutter 45. A pair of rod guide brackets 52, through which the legs 53 of the slide actuator rod 49 pass, are attached to the underside of base plate 23. Around the legs 53 of the slide actuator rod and positioned within the rod guide brackets 52, are coil springs 62 of other suitable resilient means which return the slide actuator rod 49 to its extreme outward position of movement after pressure has been released from the cup bar 50. This cup bar 50 may be concave in configuration and may be fastened to a chute actuating rod 55. Leg extensions 57 of the chute actuating rod 55 are secured to the legs 53 behind the rod guide brackets 52 so that when pressure is applied to the cup bar 50 the slide actuator rod 49 will slide through the rod guide brackets 52.

Disposed below outlet opening 40 and measuring compartment 41 is an ejection chute 56 which is adapted to be moved into and out of register with the outlet opening 40 and base plate walls 35. This ejection chute 56 is pivotally carried by the base plate 23 by a pin 59 disposed through support brackets 57, which may merely be extensions of the base plate just behind the back plate 39. Cantilever spring 60 is in facing engagement with lever 61 of ejection chute 56 and thus the spring resiliently urges the ejection chute upward to its normal position against the base plate walls 35.

Figure 3:
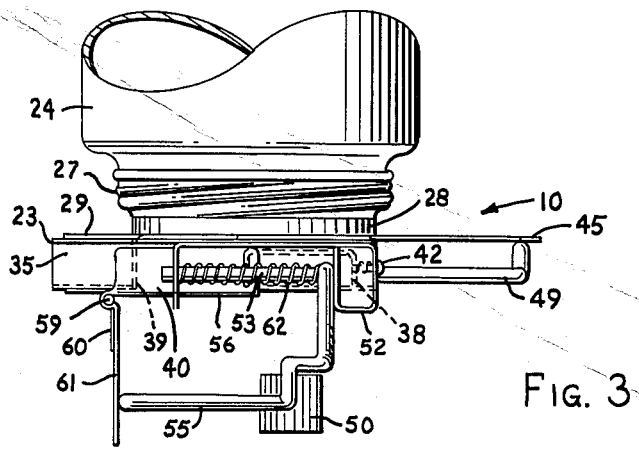
FIG. 3 is a fragmentary side elevation showing the invention in a "ready" condition.
Figure 4:
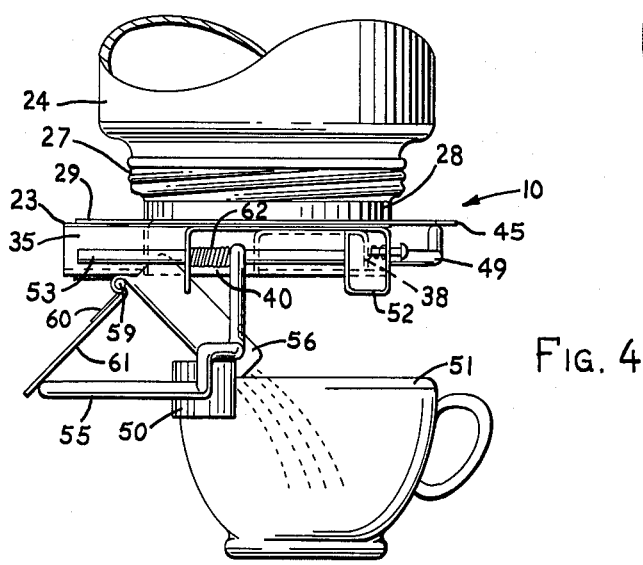
FIG. 4 is a view as in FIG. 3, but showing the disposition of parts of the invention during use.

The dispenser 10 may be applied to a container or jar 24 of coffee, or the like, by removing the dispenser 10 slidably from bracket 12, i.e., by slidably disengaging the bracket receptacles 17 from the side pieces 15 of the wall back plate 13, inverting the dispenser and screw-threading it to the jar 24 of fluent material. The device is then re-inverted and replaced on the bracket 12. In order to quickly and accurately dispense the desired quantity of fluent material, such as coffee, it is only necessary, first, to adjust screw 42 which moves the regulator 38 into and out of the compartment 41 to thus alter the amount of material which can be measured. The dispensing device is now in a state of readiness. This "ready" condition is shown by FIG. 3. Secondly, a cup 51 or some other suitable receptacle is pressed against the cup bar 50 whereby the slide actuator rod 49 moves longitudinally along the rod guide brackets 52. Upon movement of the actuator rod 49, the shutter 45 slides across the top of base plate 23 thereby sealing off the measuring compartment 41, and preventing further gravitational transfer of the powdered material into the measuring compartment from the jar above. In conjunction with the sliding movement of the shutter 45, the chute actuating rod 55 is forced against the lever 61 causing the ejection chute 56 to pivot about pin 59. The powder which was previously disposed in the measuring compartment 41 is transferred to ejection chute 56 when the chute drops by passing through outlet opening 40 and is thereby discharged into the cup receptacle 51 held against the cup bar 50. FIG. 4 illustrates this discharge of powder into cup receptacle 51 when shutter 45 is at its extreme inner position. When the cup receptacle 51 and thus the pressure is removed from the cup bar 50, the actuator springs 62 return the slide actuator rod 49, and the shutter 45 to their extreme outer position while the cantilever spring 60 urges the lever 61 and the ejection chute 56 back to their normal position thus once again sealing the outlet opening 40. As the shutter 45 returns to its extreme outer position, fluent material will again fall in a measured amount into the measuring compartment 41 to wait discharge into the ejection chute. Once again the dispensing device is in a "ready" condition as shown by FIG. 3.

Although the present invention has been described in some detail by way of illustration and example for purposes of clarity of understanding, it is understood that certain changes and modifications may be made within the spirit of the invention and scope of the appended claims.

I claim:
1. A dispensing device for fluent material, said device comprising a U-shaped housing having generally parallel spaced side pieces; said side pieces slidably engaged with bracket receptacles; a base plate fixed on said bracket receptacles; said base plate having an upwardly facing surface supporting guide plates; said guide plates supporting a jar receptacle collar which provides a seat for an inverted container of fluent material; said base plate provided with walls and a bottom plate attached to said walls; said walls and bottom plate forming a passageway through said base plate; a measuring compartment centrally located in said passageway; an outlet opening in said measuring compartment; an ejection chute below said outlet opening and in contact with said walls of the base plate; said ejection chute possessing a lever; a shutter in facing engagement with the base plate and mounted for forward and rearward reciprocatory sliding movement between the guide plates; said shutter attached to a slide actuator rod; said slide actuator rod slidably retained by rod guide brackets; a cup bar with a chute actuating rod on its back surface; said chute actuating rod located for abutting engagement with the ejection chute lever upon sliding movement of the slide actuator rod when pressure is placed on the cup bar; whereby fluent material previously disposed in the measuring compartment is discharged by the ejection chute when the shutter being activated by the slide actuator rod slides across the top of the measuring compartment to its extreme inner position.

2. A dispensing device for fluent material, said device comprising a U-shaped housing having generally parallel spaced side pieces; said side pieces slidably engaged with bracket receptacles; a base plate fixed on the upper edges of said bracket receptacles; said base plate having an upwardly facing surface supporting two guide plates; said guide plates supporting a jar receptacle collar which provides a seat for an inverted container of fluent material; said base plate provided with downwardly extending walls and a bottom plate attached to the walls; said walls and bottom plate forming a passageway through said base plate; a measuring compartment centrally located in said passageway; said measuring compartment having a back plate and a gate as its ends; an outlet opening in said measuring compartment; an ejection chute below said outlet opening and in contact with the walls of the base plate; said ejection chute forming the floor of said measuring compartment; said ejection chute possessing a downwardly extending lever; said ejection chute pivotally restrained by a pin attached to support brackets; a shutter in facing engagement with the base plate and mounted for forward and rearward reciprocatory sliding movement between the two guide plates; said shutter attached at its forward end to a slide actuator rod, said slide actuator rod slidably retained by rod guide brackets; a cup bar with a semielliptical chute actuating rod on its back surface; said chute actuating rod possessing two leg extensions secured to the rod guide brackets; said chute actuating rod located for abutting engagement with the ejection chute lever upon sliding movement of the slide actuator rod when pressure is placed on the cup bar; whereby fluent material previously disposed in the measuring compartment is discharged by pivotal ejection chute when the shutter being activated by the slide actuator rod slides across the top of the measuring compartment to its extreme inner position.

3. A dispensing device according to claim 2, in combination with resilient means mounted interiorly of said rod guide brackets and an engagement with the slide actuator rod to urge the latter rearward from its innermost position and a cantilever spring in engagement with the ejection chute to urge the latter upward to its normal position in contact with the walls of the base plate.

References Cited by the Examiner

UNITED STATES PATENTS

| 752,735 | 2/1904 | Weise | 222—363 X |
| 2,128,488 | 8/1938 | Koerner | 222—181 X |
| 2,245,703 | 6/1941 | Mueller | 222—181 X |

RAPHAEL M. LUPO, *Primary Examiner.*